A. L. Finch,
Pattern for Casting.

Nº 102,384.      Patented Apr. 26, 1870.

Witnesses.
Chs. H. Smith
Harold Serrell

Inventor.
A. L. Finch

United States Patent Office.

AMON L. FINCH, OF SING SING, NEW YORK.

Letters Patent No. 102,384, dated April 26, 1870.

IMPROVEMENT IN PATTERNS FOR CASTING.

The Schedule referred to in these Letters Patent and making part of the same.

*To all whom it may concern:*

Be it known that I, AMON L. FINCH, of Sing Sing, in the county of Westchester and State of New York, have invented an Improvement in Patterns for Castings; and the following is declared to be a correct description thereof.

Great difficulty has heretofore been experienced in the manufacture of patterns for curved and straight cast-metal pipes, such as are used in plumbing, for sewer-pipes, &c. These patterns usually are made of wood carved out, but great difficulty exists in making the pipe of a uniform thickness, and the bends are usually more or less untrue, because the one curve joins into another, and the pattern has to be carved mostly by hand.

The same difficulties arise in making patterns of stoves, sinks, and a variety of thin articles, because the pattern is difficult to carve, if of wood, because it is so thin, and, if made out of sheet-lead, it bends in molding.

My invention relates to a method of making the metal patterns of pipes, tubes, sinks, stove-plates and other thin articles, especially those that are curved, so that the cost is very much lessened and the facilities for manufacture are greatly increased, and accuracy is insured.

Figure 3:
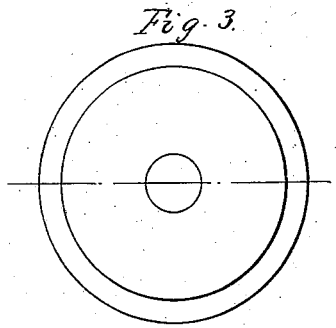
Figure 2:
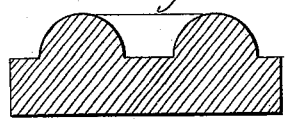

In making the pattern for a compound curved pipe, such as shown sectionally in Figure 1, I proceed as follows:

A wooden pattern is turned, of the character shown by the section, Figure 2, and face view, Figure 3.

The semicircular rib of this pattern corresponds to the external size and shape of the pipe to be formed, and the given radius of curvature.

From this pattern one or more molds are taken in sand or other material, as usual.

Figure 5:
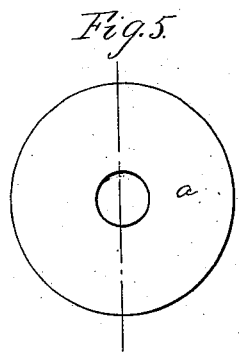
Figure 6:

The pattern is then again mounted in the lathe, and the surface of the semicircular rib cut into by a gauge the depth that corresponds to the thickness of pipe to be produced, and the surface is turned off accordingly, and then this pattern is put into the sand-mold and the space filled by melted metal run into the mold, so as to produce a circular half pipe, such as shown in Figures 5 and 6.

Figure 4:
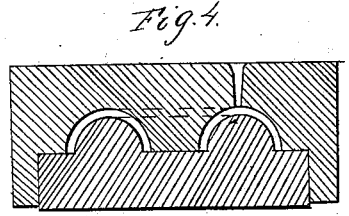

The mold is shown sectionally in Figure 4.

Two of these half pipes set together would form a ring of round pipe. It might, however, be made of an oval or other sectional form.

I saw the half-ring pipe *a* up into segments of any desired number of degrees.

Figure 1:
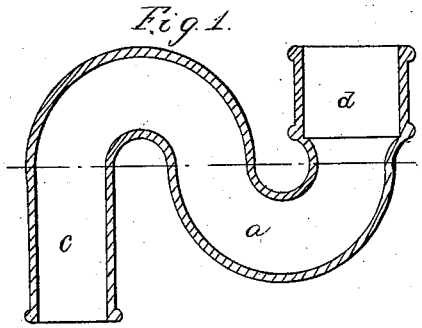
Figure 7:
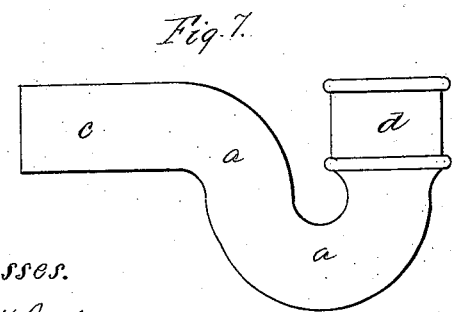

I have shown, in fig. 1, these segments as one hundred and eighty degrees each, but a half bend or trap, such as in Figure 7, would only require a bend of one hundred and eighty degrees and another of ninety degrees, but these are to be cut out as occasion requires, and I remark that the right and left-hand patterns are made of corresponding pieces, and the metal of which I make the casting is to be any suitable alloy, such as type-metal, that is rigid but easily sawed, and the different pieces are to be held together by solder.

In order to make the straight tubular portions of patterns, I turn up a piece of wood to the size and shape of the outside of the tube, and saw it in half longitudinally, or else the pattern may be made of two pieces set together before turning.

I mold this pattern in sand or otherwise, either the entire pattern or the half. I again mount it in the lathe and turn off by a scoring-gauge to the size of the inside of the tube, and cast the pipe within the mold, either as a whole pipe and afterward split it up, or else the half pipe, and I cut off the pipe in sections of the necessary length, and in all cases I remark that the division should be at right angles to the axis of the pipe, so that the shape will be such as to correspond with that of the bent tubes of the pattern.

In this manner the portions *c d* of the pattern, figs. 1 and 7, are formed.

The next operation is to take a mold from these patterns and dress it up with care and make a pattern in cast-iron. These cast-iron patterns will usually be in halves, and they are to be filed up smooth or finished in the usual manner.

By my method of making patterns I am enabled to obtain uniformity in the thickness, and effect a great saving in cost, because the cast tubes can be duplicated to any desired extent and require but little work in joining them to straight or curved pieces, and thus composing the pattern out of several pieces or sections from which the metal pattern is taken for use in the foundry.

In making patterns of stove-plates, sinks, and other articles, I proceed in the manner before indicated, and make the pattern of the exterior or surface of the shape desired, and take one or more molds therefrom in sand or other material. I then, by a gauge or tool applied to different places in the surface of the wooden pattern, indicate the depth to which the surface is to be cut away for the given thickness of the casting, and carve or dress off said surface to said point and replace the wooden pattern in the sand-mold, and cast between the two a composition or alloy similar to type-metal.

By cutting up the metal patterns produced as aforesaid and setting the sections together, larger or smaller articles of the same general character may be produced, or a particular part duplicated to any desired extent, thus effecting a very great saving in the production of the complete metal pattern for use.

I claim as my invention—

1. The mode herein specified of making a pattern in type-metal or alloy, by casting the same into the space formed between the mold of the pattern as first taken, and the wood pattern reduced to the extent required for the thickness of such cast patterns, substantially as set forth.

2. The patterns for tubular traps and bends, formed of metallic sections of curved tubes united together, substantially as and for the purposes set forth.

A. L. FINCH.

Witnesses:
CHAS. H. SMITH,
GEO. T. PINCKNEY.